United States Patent [19]

Lyman

[11] Patent Number: 5,567,544
[45] Date of Patent: Oct. 22, 1996

[54] BATTERY

[75] Inventor: Philip C. Lyman, Boulder, Colo.

[73] Assignee: Boundless Corp., Boulder, Colo.

[21] Appl. No.: 452,423

[22] Filed: May 26, 1995

[51] Int. Cl.$^6$ .............................. H01M 6/46; H01M 6/00
[52] U.S. Cl. .......................... 429/152; 429/154; 29/623.4
[58] Field of Search .............................. 429/95, 149, 152, 429/153, 154; 29/623.3, 623.4

[56] References Cited

U.S. PATENT DOCUMENTS

| | | | |
|---|---|---|---|
| 417,158 | 12/1889 | Ernst | 429/238 |
| 627,009 | 6/1899 | Paget | 429/66 |
| 1,687,752 | 11/1926 | Ellery | 429/241 |
| 3,843,412 | 10/1974 | Sundberg | 136/55 |
| 3,907,593 | 9/1975 | Marincic | 136/134 R X |
| 4,110,517 | 8/1978 | Arntzen | 429/133 |
| 4,221,854 | 9/1990 | Hammar et al. | 429/234 |
| 5,055,968 | 10/1991 | Nishi et al. | 429/129 X |
| 5,135,589 | 8/1992 | Fetcenko et al. | 148/442 |
| 5,173,376 | 12/1992 | Page et al. | 429/86 |
| 5,180,645 | 1/1993 | Moré | 429/127 |
| 5,212,026 | 5/1993 | Mitchell | 429/160 |
| 5,219,673 | 6/1993 | Kaun | 429/152 X |
| 5,230,968 | 7/1993 | Bones et al. | 429/191 |
| 5,260,095 | 11/1993 | Affinito | 427/124 |
| 5,300,373 | 4/1994 | Shackle | 429/152 |
| 5,378,247 | 1/1995 | Sasaki et al. | 29/623.3 X |
| 5,478,668 | 12/1995 | Gozdz et al. | 429/153 X |

FOREIGN PATENT DOCUMENTS 5-266268  10/1993  Japan .

OTHER PUBLICATIONS

"A Nicket Metal Hydride Battery for Electric Vehicles," *Science*, 260:176–181 (Apr. 9, 1993).

*Primary Examiner*—Donald R. Valentine
*Attorney, Agent, or Firm*—Robert G. Crouch; Chrisman, Bynum & Johnson

[57] ABSTRACT

A battery assembled in the form of a lightweight structural panel and including isolated battery cells. Each of the cells includes a honeycomb structure wherein each film-like layer in the honeycomb structure is an electrode stack. Each of the electrode stacks includes an elongated cathode, an elongated separator, and an elongated anode. The separator is wetted with an electrolyte solution to facilitate the electrochemical reaction. The electrochemical reaction may be that of an NiMH2 battery, an NiH battery, an Li$^+$ battery, an NiCd battery, a Lead-acid battery, or any other suitable electrochemical reaction. Alternatively, the battery cell could be composed of a foam-like cathode, foam-like separator, and a foam-like anode. With either embodiment, the invention achieves the storage of electrochemical energy in a structure with a multitude of voids defined therein so that the structure is relatively stiff, yet light weight.

30 Claims, 6 Drawing Sheets

BATTERY

IMPROVED BATTERY DESIGN

This invention relates to an improved design for an electrochemical battery, and, more particularly, to a distributed battery design in which the functional components of the battery serve as structural members for the vehicle or device using the battery.

BACKGROUND OF THE INVENTION

The gasoline- or diesel-powered motor vehicle with an internal combustion engine is the standard mode of conveyance for the majority of adults in civilized countries. Unfortunately, such motor vehicles with engines operating on gasoline or other hydrocarbon fuel have two significant disadvantages. First of all, the exhaust emissions from vehicles is a significant contributor to the air pollution problem in urban areas. Second, most countries do not have sufficient natural resources to produce hydrocarbon fuels (particularly gasoline) at or near market prices. Accordingly, these countries are dependent upon other countries for these resources.

For these and other reasons, momentum is building to develop motor vehicles with alternative sources of power. Among the leading candidates are electric vehicles which are powered by electrochemical batteries. In the United States, at both the state and federal levels, there are current laws and pending legislation relating to: the sale of new electric vehicles; tax credits for purchasers of electric vehicles; and requirements on the percentage of emission-free vehicles which must be sold relative to vehicles which do exhaust emissions. In 1990, the Federal Government authorized the establishment of the U.S. Advanced Battery Consortium (USABC). Under the aegis of the Department of Energy, USABC brings together Chrysler, Ford, General Motors, and the Electric Power Research Institute to sponsor research and development of batteries for electric vehicles. The USABC has identified a number of parameters, or goals, for an electric vehicle battery system.

A very basic requirement is that the battery system must be rechargeable. Aside from that, one of the most important parameters relates to the energy density of the battery system (as used herein, energy density is the total available energy per unit of mass). Since batteries inherently have much lower energy densities than other sources of energy such as fossil fuels, much of the research and development in the battery industry has related to maximizing the energy density by experimenting with new reagents involving lighter chemicals in the basic electrochemical process. Thus, batteries based on Lead-acid have been replaced with Nickel-Cadmium (NiCd) batteries, found in many consumer product applications. In space vehicles, Nickel-Hydrogen ($NiH_2$) batteries have been used. Unfortunately, the gaseous nature of the electrochemical reaction in an $NiH_2$ battery necessitates the use of a pressure vessel to contain the battery. Further, in the presence of oxygen, such as within the Earth's atmosphere, $NiH_2$ batteries have numerous safety issues relating to the flammability of the hydrogen.

Much improved battery systems based on other reagents are currently being developed. For example, some consumer products are currently supplied with Nickel-Metal-Hydride (NiMH) batteries in a further attempt to maximize the energy density. In addition, Lithium ion ($Li^+$) batteries are currently in development. Each of these types of batteries offer the advantages of increased energy density and non-toxic ingredients as compared with the older batteries using lead or cadmium.

No matter what reagents are employed for an electrochemical battery, there is a theoretical limitation with regard to energy density. That is, each molecule can give up only one electron and the voltage potential of that electron is limited by the nature of the ion created. Thus, even with the lowest atomic weight possible in a molecule, there can only be a single electron generated per molecule. This theoretically places an upper limit on the energy density of electrochemical batteries. The Lithium ion battery has the largest theoretical energy density of any of the previously-discussed reagents in use because of the low atomic weight of Lithium and high voltage potential of the Lithium ion.

Currently, one of the leading candidates for an electric vehicle battery system is for Nickel-Metal-Hydride (NiMH) batteries. A current goal for NiMH batteries is an energy density of approximately eighty Watt-hours per kilogram. By way of comparison, gasoline has an energy density on the order of magnitude of 3,000 Watt-hours per kilogram. In other words, one kilogram of gasoline can produce over thirty times as much energy as one kilogram of the projected NiMH battery.

Because of this relatively low energy density in batteries, the battery must have a very large mass. Thus, the battery system for an electric vehicle will be extremely large in volume and mass, perhaps occupying most of the engine and trunk compartments of a standard passenger automobile. As can be seen, the battery not only has a large volume and mass but is concentrated into one or two particular areas in the vehicle. Such a design can be dangerous in an automobile crash in which the concentrated, large battery may come through the trunk of the vehicle and crush the occupants and contents in the passenger compartment of the vehicle.

Typically, electrochemical batteries are placed in an outer shell or container which adds nothing to the operation or function of the battery or of the vehicle or device associated with the battery. The container is filled with stacked metal plate electrodes or a jelly-roll configuration of adjacent electrodes. As battery systems become very large for electric vehicles, the mass of this container becomes substantial. Even for relatively smaller power applications, such as space vehicles, consumer electronics, and power tools, the container itself can be viewed as wasted space and extra mass and cost. In certain space vehicles, elimination of the battery container could result in a significant mass reduction of ten to fifty percent of the battery mass.

SUMMARY OF THE INVENTION

Accordingly, it is an object of the present invention to provide an approach for maximizing the energy density of the entire vehicle or device containing the battery which is parallel and complementary to the search for better reagents and electrochemical reactions.

It is also an object of the present invention to provide a battery design in which the mass and volume of the battery are distributed about the vehicle or device requiring electrical power.

It is further an object of this invention to provide a battery design in which the components of the battery perform useful functions relevant to the vehicle or device, other than electrical power generation.

It is still further an object of this invention to provide a battery design in which the components of the battery serve as structural components for the vehicle or device.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, a battery for supplying power to an electrical circuit having a first terminal and a second terminal includes an elongated anode including a first reagent, the anode being connectable to the first terminal of the circuit. Also, an elongated cathode is positioned adjacent and in spaced-apart relation to the anode, the cathode including a second reagent and being connectable to the second terminal of the circuit. A separator is positioned between the anode and the cathode to provide electrical insulation between the anode and the cathode yet permit an electrochemical reaction to occur involving the transfer of ions between the anode and cathode, the transfer of ions allowing electrical current to flow from the cathode of the battery through the circuit to the anode of the battery. The anode, the separator, and the cathode form an elongated electrode stack and a plurality of the elongated electrode stacks are connected together in a honeycomb structure.

The invention also relates to a method for assembling a battery. The method includes the steps of providing an elongated anode including a first reagent, providing an elongated cathode including a second reagent, providing an elongated, porous separator, bonding the anode and cathode to opposite sides of the separator to form an elongated electrode stack, assembling a plurality of the elongated electrode stacks into a honeycomb structure, and wetting the separator with an electrolyte.

Another embodiment of the invention relates to a battery for supplying power to an electrical circuit having a first terminal and a second terminal, including an anode having a first reagent, the anode having a multitude of voids defined therein, wherein the anode is connectable to the first terminal of the circuit. Also, a cathode is positioned adjacent and in spaced-apart relation to the anode, the cathode having a multitude of voids defined therein and including a second reagent, wherein the cathode is connectable to the second terminal of the circuit. A separator is positioned between the anode and the cathode to provide electrical insulation between the anode and the cathode yet permit an electrochemical reaction to occur involving the transfer of ions between the anode and cathode, the transfer of ions allowing electrical current to flow from the cathode of the battery through the circuit to the anode of the battery. The separator also has a multitude of voids defined therein. The anode, the separator, and the cathode form a structure which has a multitude of voids defined therein to provide a sturdy yet light-weight structure.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In the Drawings.

DETAILED DESCRIPTION OF THE PREFERRED EMBODIMENTS

The present invention relates to battery systems including battery panels composed of one or more battery cells. The cells may be electrically connected to each other in series or in parallel to provide the desired voltage or current levels. Each cell includes a plurality of elongated, electrode stacks formed in a honeycomb structure.

Figures 1, 2:
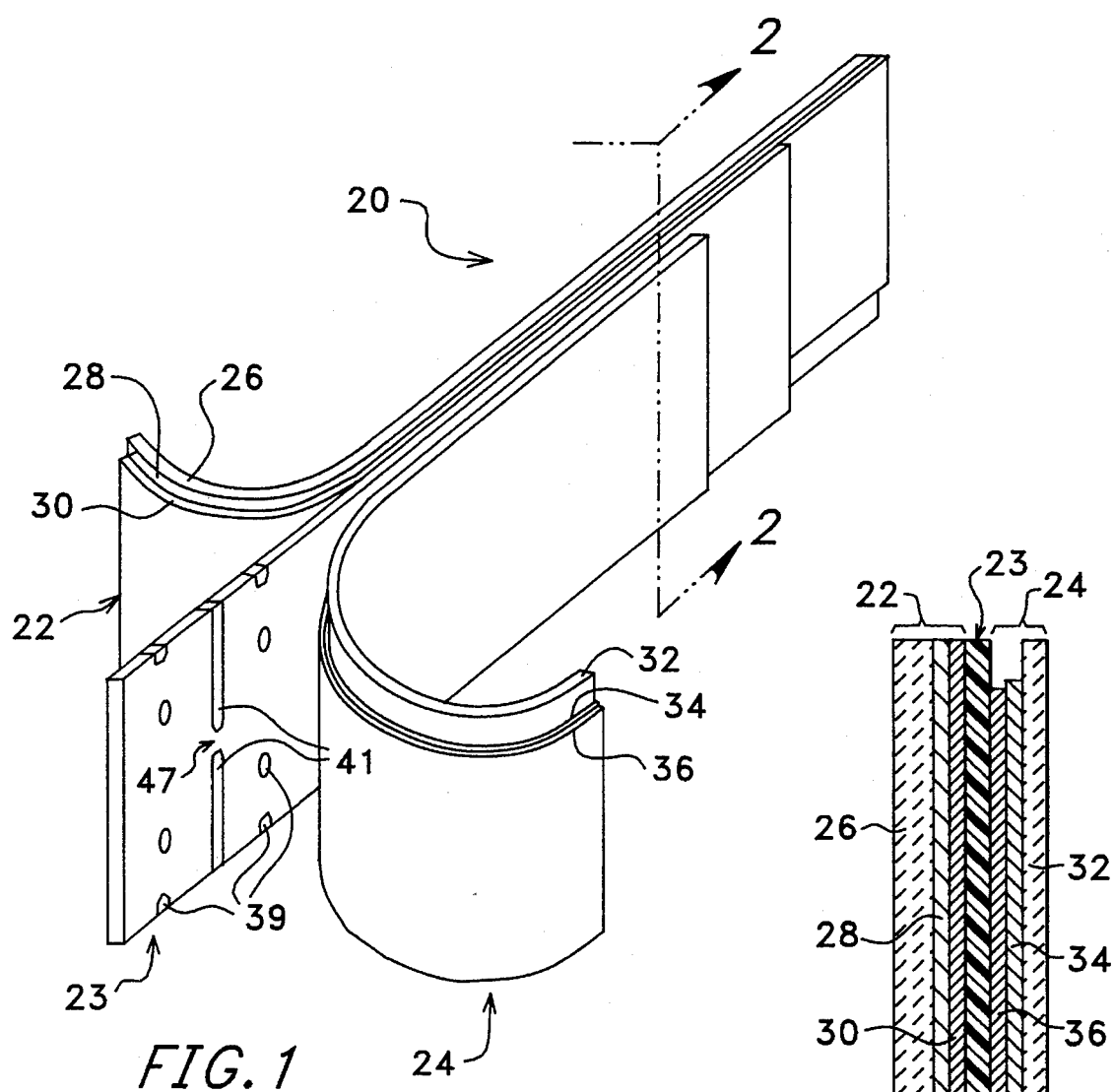
FIG. 1 is an isometric view of an electrode stack of the present invention, showing various layers of the electrode stack in peeled-away positions.
FIG. 2 is a cross-sectional view taken along line 2—2 of FIG. 1.

An elongated electrode stack 20 of the present invention is shown in FIGS. 1 and 2. The electrode stack 20 is multi-layered and includes an elongated positive electrode, or cathode 22, an elongated separator 23, and an elongated negative electrode, or anode 24. Throughout this document, the convention for cathodes and anodes in the battery industry shall be used rather than the convention in the electronics industry. Thus, during battery discharge, positive current flows from the cathode 22 through an externally-connected circuit to the anode 24. This is because the cathode 22 may be seen to be the negative terminal as viewed internally to the battery, but externally, since current flows out of the cathode of the battery, it is viewed as the positive terminal.

The cathode 22 preferably includes three layers. A fiberglass, Teflon or other insulating material is used for a substrate layer 26 of the anode. Attached adjacent to the substrate layer 26 is a cathode current collector layer 28 composed of Nickel (Ni). Attached to the current collector layer 28 is a cathode reagent layer 30 composed of Nickel-Hydroxide ($Ni(OH)_2$).

Similarly, the anode 24 is made up of three layers beginning with an anode substrate layer 32 composed of fiberglass, Teflon, or other insulating material. Attached to the anode substrate layer 32 is an anode current collector layer 34 composed of Nickel (Ni). Attached to the anode current collector layer 34 is an anode reagent layer 36 composed of a Metal-Hydride (MH). The Metal-Hydride may include a variety of materials which have the important property of being able to absorb and store hydrogen. Intermetallic alloy hydrides of use for electrochemical applications can absorb and desorb hydrogen relatively easily and thus function as reversible electrodes. Intermetallic alloy hydrides are formed by combining metals from groups IIIB–VIIB and group VIII on the periodic table of elements. Metal hydrides are classified as $AB_x$ where A constitutes any metal from the groups IIIB–VIIB and B is the metal from group VIII, with x being the relative mole ratio. Recent MH electrodes have concentrated on $AB_5$ and $AB_2$ combinations of metals. $La_{0.8}Nd_{0.2}Ni_{2.5}Co_{2.4}Si_{0.1}$ is an example of an $AB_5$ hydride. $V_{15}Ti_{15}Zr_{21}Ni_{31}Cr_6Co_6Fe_6$ is an example of an $AB_2$ hydride.

The cathode 22 and anode 24 are bonded to opposite sides of the elongated separator 23. The separator 23 has the qualities of electrically insulating the cathode 22 from the anode 24 while allowing the passage of ions therebetween via a liquid electrolyte solution (not shown), an alkaline medium consisting of twenty-six percent by weight Potassium-Hydroxide (KOH) in water, which has been wicked into the separator 23. Also, the separator 23 needs to hold the electrolyte solution, usually by being porous and absorptive. In this case, the separator may simply space apart the electrodes so as retain the electrolyte solution via capillary action. Further, the separator 23 should resist oxidation so as not to react with excess oxygen during overcharge conditions. Preferably, the separator 23 is composed of a nylon or polypropylene cloth. Alternatively, it could be a woven or screen-print cloth or felt of inorganic fibers such as asbestos or zircar. The separator 23 prevents direct contact between the cathode 22 and anode 24 which would short out the battery cell 46. The separator 23 further maintains uniform spacing between the cathode 22 and anode 24 and provides containment of the electrolyte solution. Ions are permitted to drift during charge and discharge between the cathode 22 and anode 24.

Located at spaced apart positions on the cloth-like elongated separator 23 are small areas of solid separator material 39, which serve to bond the cathode 22 and the anode 24 to the separator 23, and larger areas of solid separator material 41 which also serve to bond the cathode 22 and the anode 24 to the separator 23 and provide support and strength as a plurality of the electrode stacks 20 are converted to the honeycomb structure as described below. Of course, it is desirable to keep the size and number of the solid portions 39 and 41 to a minimum as they reduce the energy storage capacity of the electrode stack 20 and, consequently, of the entire battery system. Further, the larger areas of solid material 41 are not continuous throughout the separator 23; instead a gap 47 is defined through which the electrolyte solution can pass. The bonding provided by the smaller areas of solid material 39 keeps the cathode-to-anode separation from becoming too large and allows the stack to be handled. The larger areas of solid material 41 provide bonding between the electrodes which reinforces the super-stack when subjected to separating forces during the expansion process into the honeycomb structure 44. In all cases, the solid areas 39 and 41 are designed so as to not create isolated regions within the separator 23. Thus, the Potassium-Hydroxide electrolyte solution is still provided a pathway into and out of every region of the separator 23.

As viewed in cross-section in FIG. 2, it can be seen that the reagents and conductors of the cathode 22 and anode 24 are slightly vertically offset from each other. This allows for external electrical connection to the cathode 22 and anode 24 via the top and bottom of the stack 20, respectively. This technique reduces the likelihood of electrical shorting between the cathode 22 and anode 24.

Figure 3:
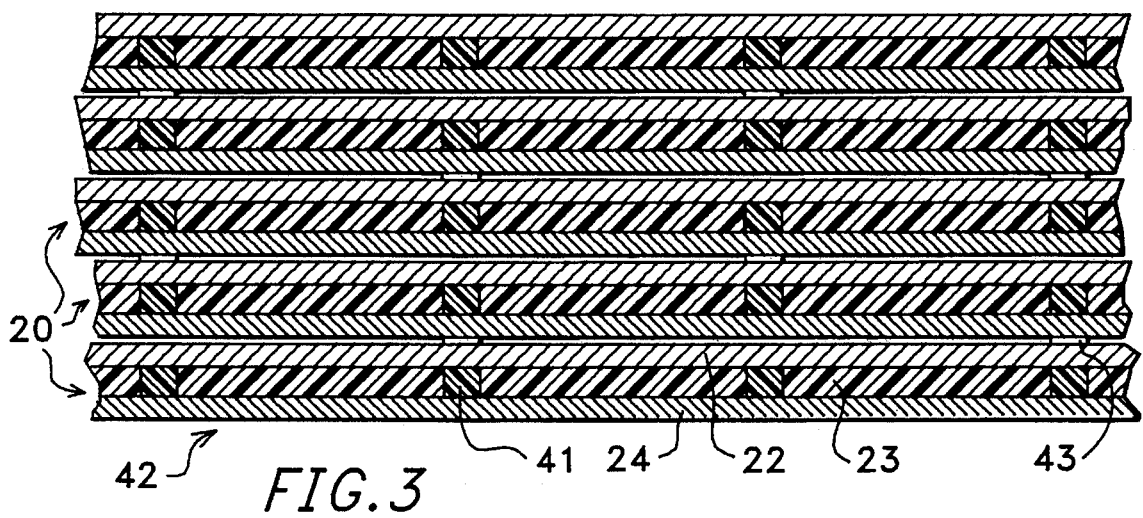
FIG. 3 is a cross-sectional view of a plurality of the electrode stacks of FIG. 1, the plurality of electrode stacks being arranged into a super-stack.
Figure 4:
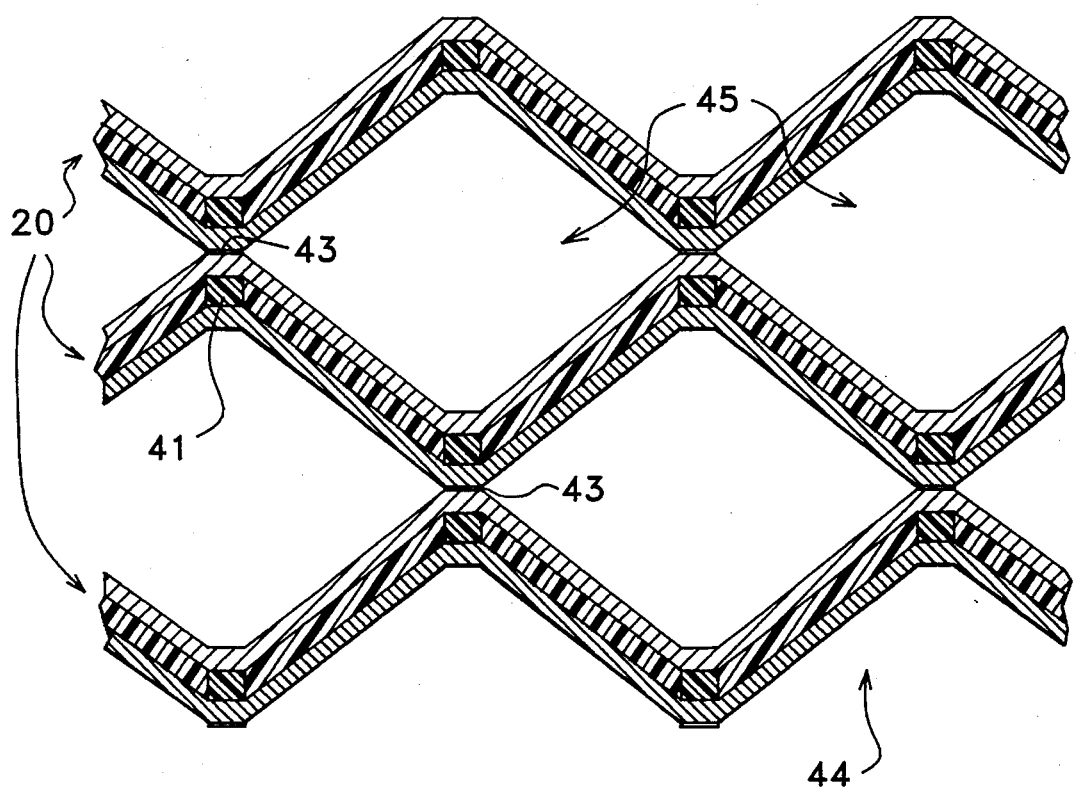
FIG. 4 is a cross-sectional view of the super-stack of FIG. 3 after the super-stack has been pulled into a honeycomb shape.

A plurality of electrode stacks 20 are adhered together into a super-stack 42 by adhesive 43, as shown in FIG. 3. The adhesive 43 must be resistant to attack from the electrolyte solution. As described in further detail below, this super-stack 42 can be pulled into a honeycomb structure 44, as shown in FIG. 4. The voids 45 defined between the adjacent electrode stacks 20 in the honeycomb structure 44 are generally empty but may be partially filled with the electrolyte solution.

A desired number of electrode stacks 20 of a desired length can be combined together to form the aforesaid honeycomb structure 44 in a rectangular, box-shape or battery cell 46. The length of the battery cell 46 is determined by the length of the elongated electrode stacks 20 and the number and width of the adhesive bonds 43. The width of the cell 46 is determined by the thickness and number of the electrode stacks 20. The height of the cell 46 is determined by the height of the electrode stacks 20. This height will vary depending upon the application and even within the same application. For a motor vehicle, the height may be in the range of two inches or smaller or may be up to twelve inches or larger. For electronic housing, such as for a laptop computer, it may be in the range of one-quarter of an inch or smaller.

Figures 5, 6:
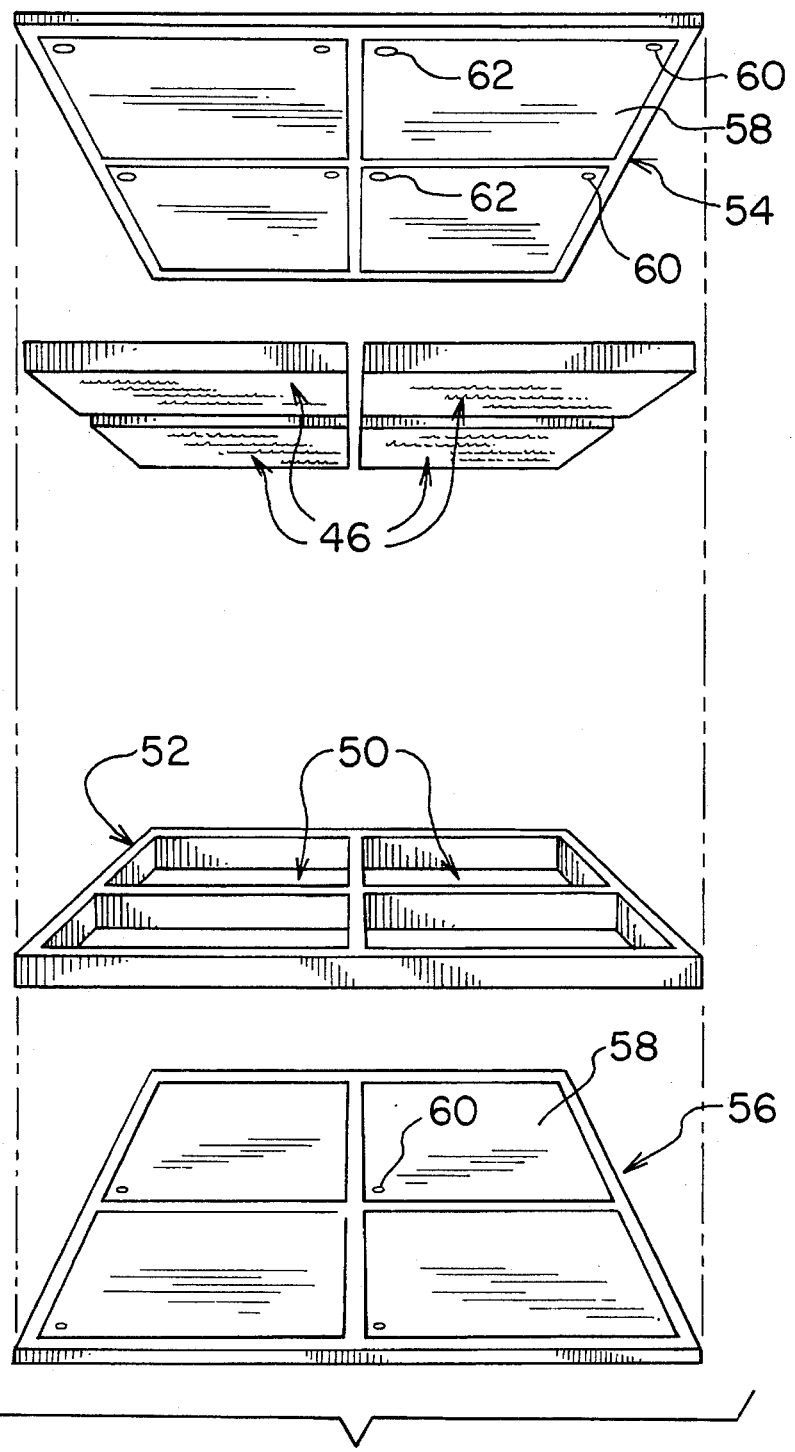
FIG. 5 is an exploded perspective view of a battery panel constructed in accordance with the present invention.
FIG. 6 is a side-view of an upper faceplate from the battery panel shown in FIG. 5.

As shown in FIG. 5, a plurality of cells 46 can be contained in a battery panel 48. Each of the cells 46 fit within corresponding cut-outs 50 defined in an insert frame or layer 52 composed of an electrically-insulating material so as to isolate each of the cells 46 from each other. Preferably, the insulating material is injection-molded and machined nylon or polypropylene. Attached to the insert layer 52 on opposite sides thereof are an upper faceplate 54 and a lower faceplate 56. On the inner surface of each of the faceplates 54 and 56 are four, square conductive sheets 58 which correspond and are positioned adjacent to the four cells 46. Because of the previously-described vertical offset between the cathode 22 and anode 24 in the electrode stacks 20, the conductive sheets 58 on the upper faceplate 54 make electrical contact with the cathode 22 of each electrode stack 20 while the conductive sheets 58 of the lower faceplate 56 make electrical contact with the anode 24 of each electrode stack 20.

A path for electrical feed-through from each conductive sheet 58 though the upper and lower faceplates 54 and 56 is provided by a pin 60 attached to each conductive sheet 58, as shown in FIG. 6. On the upper faceplate 54, an activation port 62 is provided through the faceplate. The activation port 62 allows for the addition and removal of the electrolyte solution from each cell 46.

Figure 7:
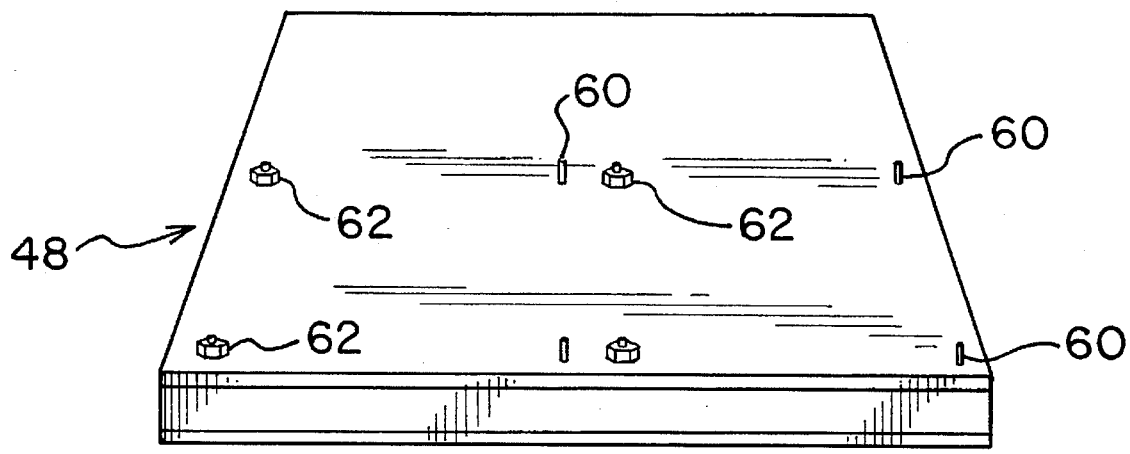
FIG. 7 is a perspective view of an assembled battery panel such as is shown in FIG. 5.
Figure 8:
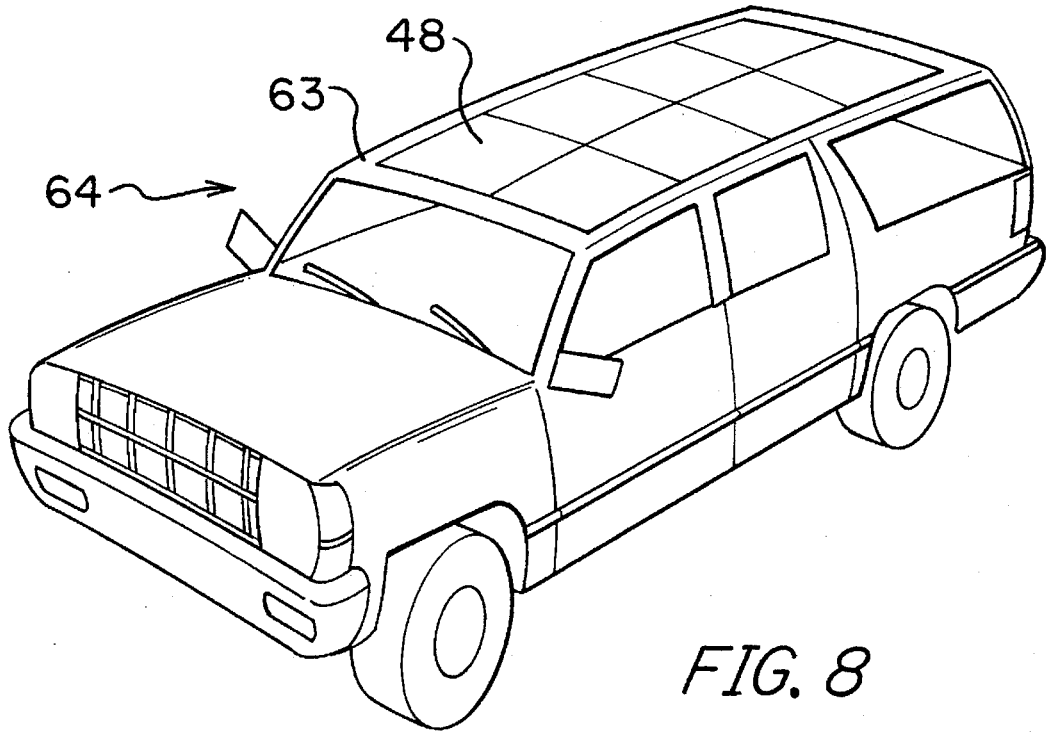
FIG. 8 is a perspective view of a passenger vehicle including a plurality of the battery panels of FIG. 7.

Once assembled, a plurality of battery panels 48 (FIG. 7) can be used as the body surface of a motor vehicle such as is shown on the roof 63 of a passenger vehicle 64 in FIG. 8. Of course, additional panels 48 could be used for the doors, fenders, hood, underbody, and within the engine compartments and other sections of the vehicle 64.

Assembly Process

The electrode stack 20 is assembled as follows. A Nickel metal plasma is sputtered or electrochemically deposited onto the thin film of fiberglass or Teflon making up the cathode substrate layer 26. This sputtering or deposition creates the cathode current collector layer 28 of Nickel. The surface of this layer 28 which is opposite from the substrate layer 26 is coated with Nickel-Hydroxide by chemical impregnation or electrochemical impregnation. Chemical impregnation includes four steps:

1) soaking in Nickel-Nitrate solution;
2) Soaking in a Sodium-Hydroxide solution to precipitate $Ni(OH)_2$;
3) Washing; and
4) Drying.

These four steps may be repeated to obtain the desired amount of $Ni(OH)_2$. Cobalt-Nitrate may be added to the Nickel-Nitrate with the Cobalt being four to eleven percent of the Nickel content. This improves the stability of this battery electrode when exposed to charge/discharge cycling.

In an electrochemical impregnation technique the Nickel layer 28 is exposed to a Nickel-Nitrate solution while electrically polarizing the layer 28 using an external voltage source (not shown). Electrolysis of the water increases the pH value of the solution near the Nickel layer 28 as a result of the reduction of Nitrate ions related to the consumption of Hydrogen ions. Nickel-Hydroxide is thus precipitated. Parameters for one such electrochemical impregnation process are as follows:

| | |
|---|---|
| Nickel-Nitrate Concentration | 1.6–1.7 molar |
| Cobalt-Nitrate Concentration | 0.16–0.18 molar |
| Ethanol Concentration | 46% by volume |
| Ph | 2.5–3.0 |
| Solution Temperature | 61° C.–72° C. |

Impregnation time will depend on the thickness of Nickel-Hydroxide desired. The desired thickness involves a trade-off between energy storage and ability to conduct. Generally, the Nickel current collector layer 28 will be thinner than the Nickel-Hydroxide reagent layer 30. Based on the molecular weight of Nickel-Hydroxide, a minimum of 3.46 grams of Nickel-Hydroxide must be provided for each ampere-hour of capacity desired. The current collector layer 28 of Nickel in between the reagent layer 30 and the substrate layer 26 performs the added function of structurally reinforcing the underlying material of the substrate layer 26. The entire cathode 22 is on the order of two thousandths of an inch thick.

In theory, the separator 23 should be of infinitesimal thickness. The amount of electrolyte solution is smaller with smaller separations, thus reducing the total mass of the electrode stack 20. Cathode-to-anode separations between seven and fifteen mils are typically used in space-qualified batteries using Nickel-Hydroxide as the cathode. This minimum distance is required to allow for positive plate expansion and resulting positive plate adsorption of electrolyte. Since neither of these factors are significant with the thin film cathode 22 of the present invention, a four mil separator is implemented.

The anode 24 is similar to the cathode 22 in that the anode substrate layer 32 is composed of the thin film of fiberglass or Teflon with a Nickel metal plasma which is melted sputtered, or electrochemically or vapor deposited onto the surface thereof to create the anode current collector layer 34 of Nickel. The reagent layer 36 is formed by depositing metallic crystals of a Metal-Hydride. The preferred method for depositing the Metal-Hydride is to plasma-sputter using a target material (source of the plasma) with the desired alloy ingredients of an $AB_2$ or $AB_5$ hydride as described earlier. Some of the lower efficiency hydrides require as much as 3.46 grams of deposited reagent for every ampere-hour desired. Preferably, a more efficient Metal-Hydride can be used having efficiencies in the range of 1.5 grams of Metal-Hydride needed per ampere-hour capacity (2.5% hydrogen storage by weight). Such efficiencies have reportedly been achieved by Ovonics Battery Corporation with more efficient, $AB_5$, Metal-Hydride materials.

The three components of the electrode stack 20, the cathode 22, the anode 24 and the separator 23, are bonded together by aligning the three elongated components and spot welding the cathode 22 and anode 24 to opposite sides of the separator 23. A pair of opposed probes (not shown) can be applied to the sandwich arrangement to heat the assembly to just below the melting point of the material making up the separator 23. The compression force applied by the opposed probes along with the near-molten state of the separator 23 causes a spot weld on either side of the separator 23 to the cathode 22 and to the anode 24. These spot welds are formed in the regions where the solid portions 39 and 41 are provided in the separator 23. At this point, the elongated electrode stack 20 has been created. Alternatively, either the cathode or the anode could be produced without the supporting substrate layer and this resulting, relatively-flimsy electrode could be held against the separator by capillary action.

A plurality of such electrode stacks 20 can be aligned and stacked on top of each other with regions of adhesive 43 between each of the adjacent stacks 20, as shown in FIG. 3. As can be seen, the location of the adhesive 43 corresponds to and is adjacent to the position of the larger areas of solid material 41 in the separator 23 of each aligned electrode stack 20. Preferably, a first pair of adjacent electrode stacks 20 will have adhesive 43 applied adjacent to every second position of solid material 41 in the separator 23. Each of this first pair of electrode stacks 20 is also adjacent to another electrode stack, an oppositely-adjacent electrode stack. The adhesive positions between each of the first pair of electrode stacks is offset from the adhesive positions between one of the first pair of electrode stacks and its oppositely-adjacent electrode stack, as is further shown in FIG. 3. The adhesive 43 is positioned adjacent to the larger areas of solid material 41 in the separator 23 to strengthen the honeycomb structure that is next formed, as will be appreciated.

The multi-layer electrode stack, or super-stack 42 is next pulled apart by pulling in opposite directions on the top and bottom electrode stack of the super-stack 42. The top and bottom electrode stacks are pulled from the positions corresponding to points equidistant between each adhesive position on the top and bottom electrode stack. In this manner the honeycomb structure 44 is formed from the super-stack 42. As an example of this, a portion of the super-stack in FIG. 3 can be seen to be pulled into the honeycomb structure shown in FIG. 4. It can be seen in FIG. 4 that the positions of the adhesive 43 are in alignment with the solid material 41 in the separator 23, providing for increased reinforcement and so that the stress induced upon the super-stack 42 by expansion into the honeycomb structure 44 does not cause uneven spacing between the cathodes 22 and anodes 24.

The number of layers or electrode stacks 20 in the super-stack 42 and the spacing of the adhesive positions 43 are tailored such that the expanded honeycomb structure 44 meets two criteria. First, the dimension and direction of expansion matches that desired. Second, the core spacing of the honeycomb structure 44, coupled with the structural properties of the honeycomb structure 44 (determined by the modulus of elasticity and yield point of the structure) sum together to provide the desired structural strength and stiffness to the honeycomb structure 44 which forms the battery cell 46. As discussed above, one dimension of the battery cell 46 is determined by the number and thickness of the electrode stacks 20 and the width of and spacing between the adjacent adhesive positions 43. A second dimension of the battery cell 46 is determined by the length of the elongated electrode stacks 20 and the width of and spacing between the adjacent adhesive positions 43. The third dimension of the battery cell 46 is determined by the height of the electrode stack 20. The density of, or conversely the volume of the voids 45 in, the honeycomb structure 44 is a trade-off between the desired strength and stiffness of the battery panel 48 and the total weight thereof.

Next, four of the battery cells 46 are assembled together into the battery panel 48. An electrically-insulating epoxy (not shown) is first applied to all of the inner surfaces of the insert layer 52. The four battery cells 46 are then slidably received within the cut-outs 50 in the insert layer 52. Electrically-conductive epoxy (not shown) is applied to the electrically-conductive sheets 58 of the faceplates 54 and 56. Electrically insulating epoxy (not shown) is applied to other regions of the faceplates 54 and 56. The upper and lower faceplates 54 and 56 are then epoxied to the insert layer 52 and battery cells 46. The electrically-conductive epoxy bonds the conductive sheets 58 of the upper and lower faceplates 54 and 56 to the battery cells 46 while the electrically-insulating epoxy bonds the upper and lower faceplates 54 and 56 to the insert layer 52. During the bonding of the epoxy, the battery panel 48 must be compressed together. This may be done by placing the entire battery panel 48 within concentric bags (not shown) and increasing the pressure between the bags such that the inner bag compresses the upper and lower faceplate 54 and 56 against the insert layer 52 and battery cells 46.

Up to this point, the separator 23 does not contain any electrolyte solution. After the assembly of the battery panel 48, the electrolyte solution is added through the fluid port 62 in the upper faceplate 54. Each of the battery cells 46 within the battery panel 48 is then flooded with the Potassium-Hydroxide electrolyte solution and allowed to soak. Then, most of the solution is drawn off under vacuum through the port 62, leaving the separators 23 wetted with the electrolyte solution. The cells 46 of the battery panel 48 are charged and discharged a few times to break in the battery panel 48. Each of the battery cells 46 is then filled with nitrogen gas and the port 62 is closed.

In addition to epoxying the battery panel together it is possible to drill holes (not shown) through the upper and lower faceplates 54 and 56 and the insert layer 52 in order to bolt the battery panel together. Further, drilling such holes allows for external structural connection of the battery panel 48 to the surrounding vehicle or device. Alternatively, the battery can be glued to the surrounding device or vehicle. The insert layer 52 serves to electrically isolate each of the battery cells 46 from each other. Thus, if any one of the battery cells 46 is faulty, it can be prevented from adversely effecting the other battery cells 46. Further, the insert layer 52 serves to spread the load across the battery panel. As an example, the insert layer 52 can distribute point loads from the point of structural attachment to the battery panel to the area along the insert layer 52.

Once assembled a plurality of battery panels can be combined electrically and structurally to form both the power source for a vehicle or device and structural components thereof. The construction and structure of this improved battery provides for large surface areas of parallel plates giving capacitative advantages to the design.

The electrochemical reaction

The electrochemical reaction in each electrode stack 20 is that of the known Nickel-Metal-Hydride battery. This electrochemical reaction is disclosed more fully in Volume 260 of Science Magazine, starting at page 176, dated Apr. 9, 1993, in an article entitled "A Nickel Metal Hydride Battery For Electrical Vehicles" which is hereby incorporated by reference.

The NiMH battery has a nominal voltage of 1.2 V. It stores Hydrogen as a reaction product in the solid Hydride phase, unlike the Nickel-Hydrogen battery which stores Hydrogen as a high-pressure gas. The anode 24 (negative electrode) includes a hydrogen storage material (the Metal-Hydride) to allow electrochemical storage and to release hydrogen during the charge and discharge processes, respectively. The Nickel-Hydroxide reagent layer 30 in the cathode 22 (positive electrode) is electrochemically reversible between $Ni(OH)_2$ and Nickel Oxyhydroxide (NiOOH). At both electrodes 22 and 24, oxidation-reduction reactions take place in an alkaline medium including twenty to thirty-five percent by weight KOH in water. During charge, the $Ni(OH)_2$ electrode is oxidized and the MH electrode is reduced. As a result, water is separated into Hydrogen and Hydroxyl ions, with Hydrogen being absorbed by the metal in the negative electrode to form MH. At the positive electrode, the Hydroxyl ion reacts with the $Ni(OH)_2$ electrode to form NiOOH. This reaction results in a change in the Ni oxidation state from +2 to +3. The half-cell reactions on charge and discharge of the battery cell 46 can be written as:

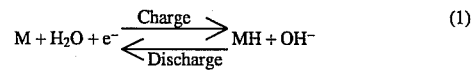  (1)

  (2)

As a consequence of reactions 1 and 2, there is no net change in the quantity or concentration of the electrolyte solution over the charge-discharge cycle. This result contrasts with other alkaline electrolyte systems such as NiCd where water is generated at both electrodes during discharge. Although transient electrolyte concentration gradients can occur in the NiMH battery, its constant average concentration has the important consequences of good overall performance in gas recombination, kinetics, high- and low-temperature operation, and resistance to cycle-life limitations produced by corrosion and swelling.

Electrical Aspects

The NiMH battery produces a nominal voltage of 1.2–1.3 volts. The total voltage of the battery system can be provided in multiples of this voltage by providing battery cells 46 in series with each other. For example, placing ten such batteries cells 46 in series would provide a battery voltage of 12 to 13 volts. The voltage of the electrochemical reaction is affected by ambient temperature. The effect on voltage is a function of the temperature in degrees Kelvin to a multiple power. Thus, across typical atmospheric temperature variations, the voltage does not vary radically. Further, as the temperature becomes too high, the increased benefits from increased voltage from the reaction are offset by the problem of excessive chemical corrosion of the battery components.

The total battery capacity or energy density is dependent on the amount of reagent in the cathodes 22 and anodes 24. In other words, how many reagent molecules are available to each give up an electron.

For redundancy purposes and in order to prevent failed battery cells 46 which are connected in parallel to other battery cells from adversely affecting those battery cells, diodes, circuit breakers and relays can be used to control and prevent short circuiting in one circuit from adversely effecting an adjacent parallel circuit.

The current produced by the battery system is determined by the total surface area or amount of reagent in the battery system. Thus, for a given battery cell size, the current produced by the battery system can be increased by placing additional battery cells in parallel with each other. The current is also a function of the spacing between the anode 24 and cathode 22. The current within a given battery cell is governed by the availability of ions from the electrolyte at the surfaces of the electrodes. This, in turn is governed by the distance ions must drift through the electrolyte to cross the separator. With this design, the spacing is smaller, due to the smaller effects of material expansion as cited earlier. Higher charge and discharge currents may be achieved.

The acceptable charge and discharge current levels are also governed by heat generated. The net discharge reaction is slightly exothermic. Since the layer of reagent is very thin, and the honeycomb structure includes large void volume, the heat generated per unit volume is substantially less than in a compact stand-alone battery design. Again, this design may achieve higher currents.

Alternative Electrochemical Embodiments

Figure 10:
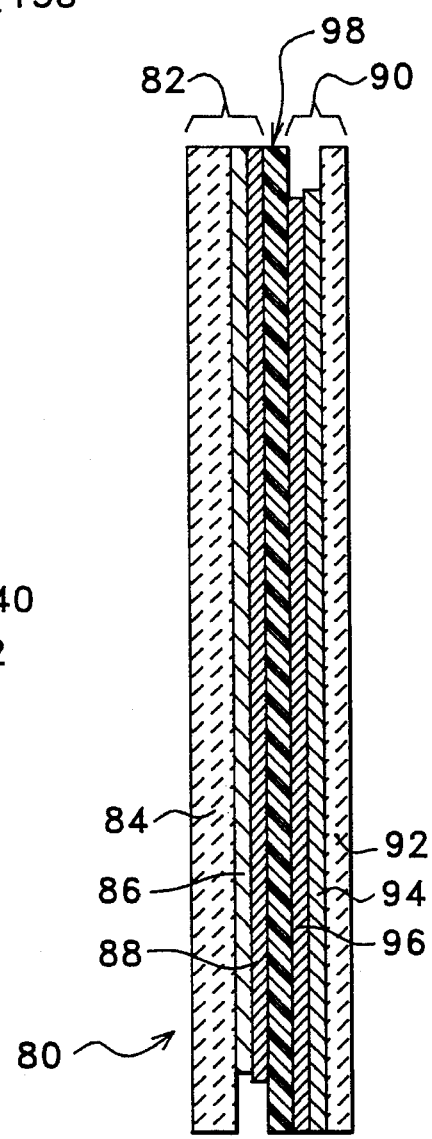
FIG. 10 is a cross-sectional view similar to the view of FIG. 2, showing a third embodiment of an electrode stack, the stack having an alternative electrochemical embodiment.

As an alternative to the NiMH battery, it is possible to use several other electrochemical embodiments or processes. An electrode stack 80 for a Nickel-Hydrogen (NiH$_2$) electrochemical embodiment is shown in FIG. 10. A cathode 82 preferably includes three layers starting with a fiberglass, Teflon or other insulating material used for a substrate layer 84 of the cathode 82. Attached adjacent to the substrate layer 84 is an cathode current collector layer 86 composed of Nickel (Ni). Attached to the cathode current collector layer 86 is a cathode reagent layer 88 composed of Nickel-Hydroxide (Ni(OH)$_2$).

Similarly, an anode 90 is made up of three layers beginning with an anode substrate layer 92 composed of fiberglass, Teflon, or other insulating material. Attached to the anode substrate layer 92 is an anode current collector layer 94 composed of Nickel (Ni). Attached to the anode current collector layer 94 is an anode catalyst layer 96 composed of Platinum (Pt).

The cathode 82 and anode 90 are bonded to separate side to opposite side of an elongated separator 98. The separator 98 has the qualities of electrically insulating the cathode 82 from the anode 90 while allowing the passage of ions therebetween via a liquid electrolyte (not shown) which has been wicked into the separator 98. Preferably, the separator 98 is composed of a nylon or zircar cloth. The electrolyte solution is an alkaline medium consisting of roughly thirty percent by weight Potassium-Hydroxide (KOH) in water. All layers include gas permeability or perforations to allow hydrogen and oxygen to circulate throughout the cell. In this embodiment, the faceplates of the battery panels must include catalyst sites for oxygen and hydrogen recombination in case of overcharge. A wicking material must be provided which allows the newly reformed water to return to the separator between the electrodes. Otherwise the separator may dry out.

Cathode half reaction

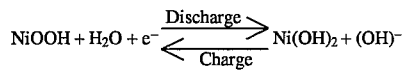

$$NiOOH + H_2O + e^- \underset{\text{Charge}}{\overset{\text{Discharge}}{\rightleftarrows}} Ni(OH)_2 + (OH)^-$$

Anode half reaction

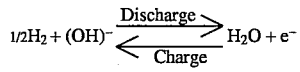

$$1/2 H_2 + (OH)^- \underset{\text{Charge}}{\overset{\text{Discharge}}{\rightleftarrows}} H_2O + e^-$$

Net reaction

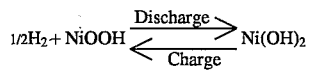

$$1/2 H_2 + NiOOH \underset{\text{Charge}}{\overset{\text{Discharge}}{\rightleftarrows}} Ni(OH)_2$$

Gaseous hydrogen generated at the anode 90 during charge is channeled away from the separator 98 and into the empty spaces of the honeycomb structure. The large volume of empty space occurring in the honeycomb structure allows the battery to operate at a lower pressure. Depending on the construction, a battery operating at a maximum pressure of one hundred psi and serving as a structural panel for a larger assembly may be created. In typical spacecraft applications, Nickel-Hydrogen batteries operate at maximum pressures as high as 2,000 psi. The creation of the super-stack, battery cells, faceplates, electrical connections, activation ports, and battery panel are the same as in the NiMH embodiment described previously.

In addition to the battery components serving as structure, the enclosing faceplates and inserts provide a natural container for the hydrogen generated during charge. This eliminates the need for a separate stand-alone pressure vessel, thereby reducing the overall weight of a device using this type of battery electrochemistry.

Figure 11:
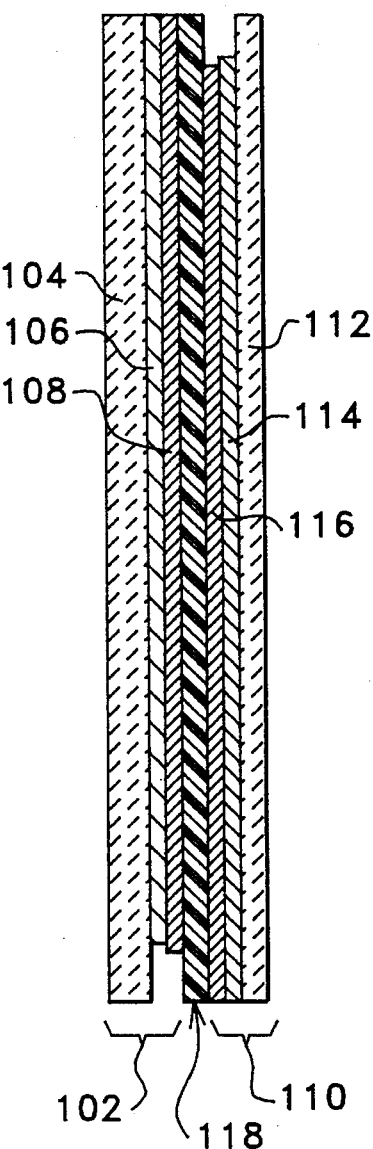
FIG. 11 is a cross-sectional view similar to the view of FIG. 2, showing a fourth embodiment of an electrode stack, the stack having another alternative electrochemical embodiment.

An electrode stack 100 of another electrochemical embodiment, a Lithium ion embodiment, is illustrated in FIG. 11. A cathode 102 preferably includes three layers starting with a fiberglass or Teflon material used for a substrate layer 104 of the cathode 102. Attached adjacent to the substrate layer 104 is a cathode current collector layer 106 composed of Nickel (Ni) or Aluminum (Al). Attached to the cathode current collector layer 106 is a cathode reagent layer 108 composed of a material which can receive and store Lithium ions such as Manganese-Dioxide (MnO$_2$).

Similarly, an anode 110 is made up of three layers beginning with an anode substrate layer 112 composed of fiberglass or Teflon. Attached to the anode substrate layer 112 is an anode current collector layer 114 composed of Nickel (Ni) or Aluminum (Al). Attached to the anode current collector layer 114 is an anode reagent layer 116 composed of a source of Lithium ions such as Lithium metal (Li). The cathode 102 and anode 110 are bonded to opposite sides of an elongated separator 118. The separator 118 has the qualities of electrically insulating the cathode 102 from the anode 110 while allowing the passage of ions therebetween. Preferably, the separator 118 is composed of a polymeric material stabilizing a Lithium salt which is normally molten at room temperature.

During charge and discharge, Lithium ions are either created from Lithium metal and migrate across the separator to the Manganese-Dioxide or returned through the separator to the Lithium metal. The creation of the super-stack, battery cells, faceplates, electrical connections, and battery panel are the same as in the NiMH embodiment described previously. The activation ports are not needed. The substrates, current collectors, separator and reagents all serve as a composite structural element of the honeycomb core in the same manner as in the previously described embodiments.

From the above examples of alternative electrochemical embodiments it should be apparent to anyone practiced in the art that this invention can be implemented with almost any known or yet to be discovered electrochemical reaction for batteries, such as NiCd or Lead-acid batteries. The electrodes and separators need to be configured in an elongated manner and formed into a honeycomb core material, in which they serve as structural elements as well as battery components to thereby allow distribution of the mass volume of the battery throughout the vehicle or device requiting electrical power and in which the elements of the battery perform another useful function for the vehicle or device in addition to energy storage.

Alternative Structural Embodiments

Figure 9:
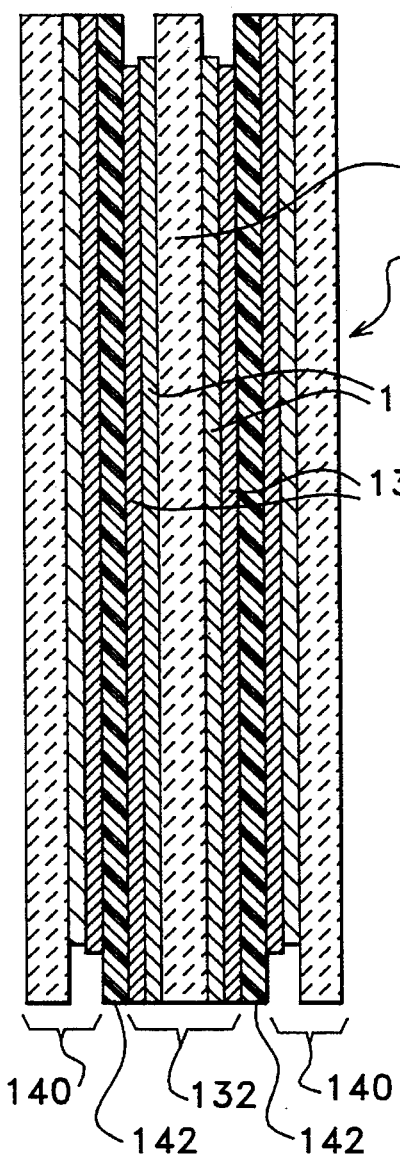
FIG. 9 is a cross-sectional view similar to the view of FIG. 2, showing a second embodiment of an electrode stack, the stack having a bipolar electrode arrangement.

An alternative structural embodiment of an electrode stack 130 for an NiMH is illustrated in FIG. 9. The electrode stack 130 is similar to the first embodiment for an NiMH battery described above in conjunction with FIG. 2. In this embodiment, however, an anode 132 is two-sided, having a current collection layer 134 on either side of a substrate layer 136 and a reagent layer 138 on the outer sides of the current collection layers 134. An identical cathode 140 and separator 142 to the ones 22 and 23 described above are bonded to each side of the anode 132. The electrode stack 130 thus formed is bipolar. This bipolar arrangement can be used with any electrochemical embodiment for a battery such as those described above.

Figure 12:
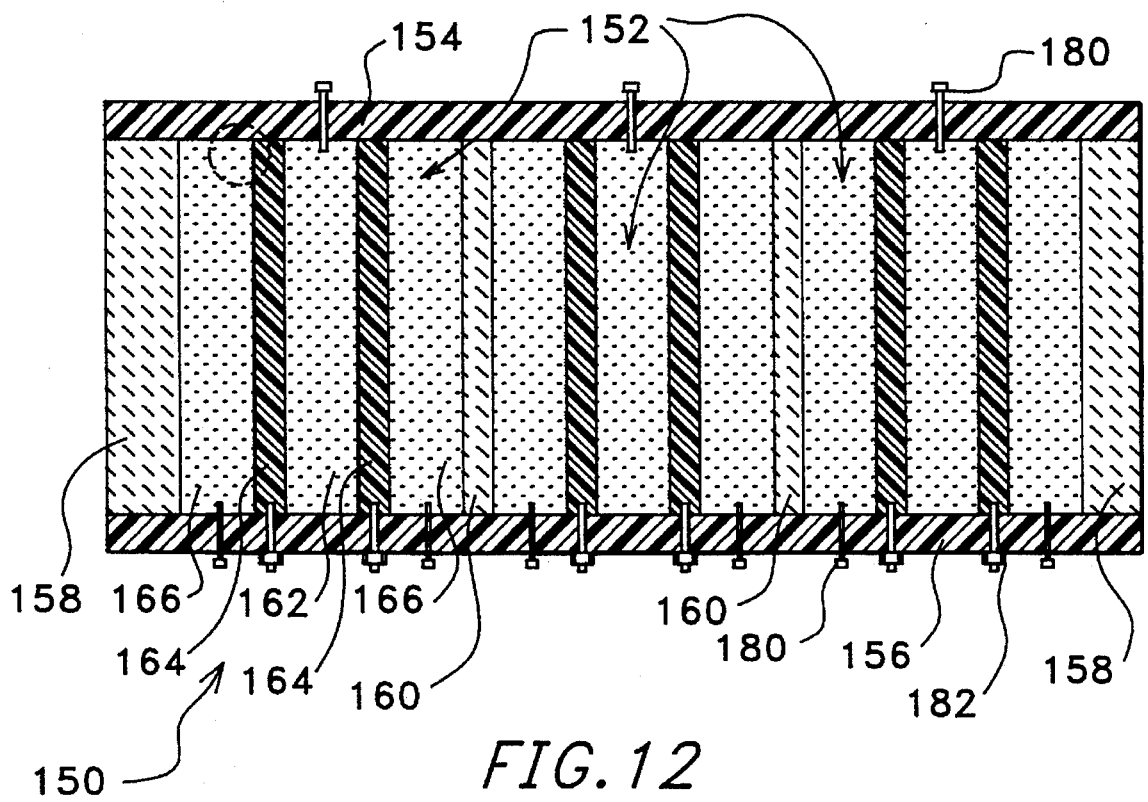
FIG. 12 is a cross-sectional view of an alternative embodiment of the battery panel of FIGS. 5 and 7.
Figure 13:
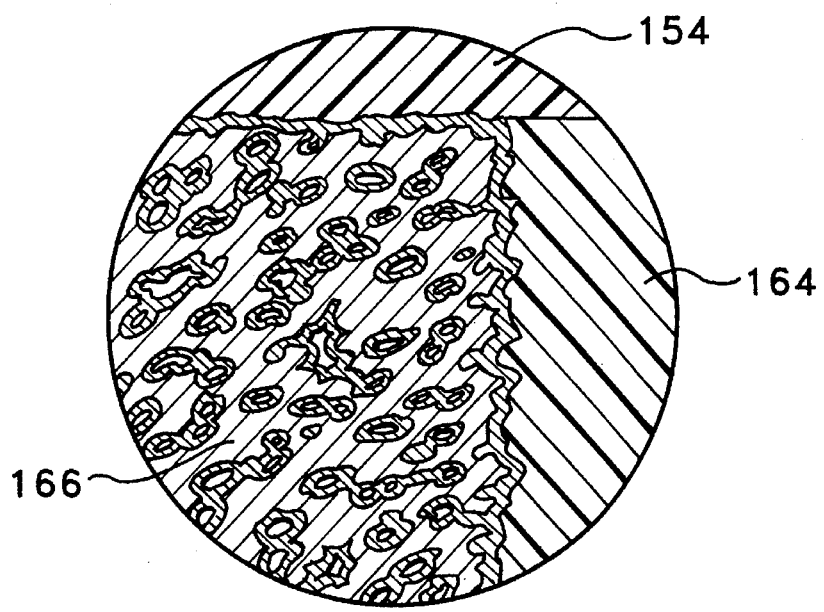
FIG. 13 is a close-up view of the encircled area of FIG. 12 showing the foam structure.

An alternative embodiment to the battery panel 48 of FIGS. 6 and 7, is illustrated by a battery panel 150 in FIGS. 12 and 13. In this embodiment, there is no honeycomb structure of electrode stacks. Instead, the battery panel 150 of this embodiment includes a plurality of battery cells 152 composed of foam. FIG. 12 shows the battery panel 150 with three such cells 152 enclosed between an upper and lower faceplate 154 and 156, and a pair of edge closures 158. Each of the three cells 152 is isolated from each other by a cell boundary layer 160 which is electrically-insulating structural foam such as polystyrene. Within each cell 152 there is a bipolar arrangement with a centered anode 162, a separator 164 on either side thereof, and a cathode 166 on the opposite sides of each of the two separators 164. As seen in the closeup view of FIG. 13, the cathode 166 includes a Nickel foam with a highly porous surface which is impregnated with Nickel-Hydroxide. In a similar fashion, the surface areas of the anode 162 are coated with a Nickel-Metal-Hydride. The nickel foam in the anode 162 and the cathodes 166 act as the current collector layer did in the first embodiment. An electrical feed-through in the form of a pin 180 is provided from the anode 162 and the cathodes 166 through the upper and lower faceplates 154 and 156, respectively. Activation ports 182 are provided through the lower faceplate 156 to wet the separator 164 with a Potassium-Hydroxide electrolyte solution (not shown). It can be seen that this structure provides the same electrochemical reaction as with the first embodiment, and also provides a structure with a plurality of voids defined therein so as to reduce the mass and provide the capability to absorb mechanical energy from impact.

Foamed metals and plastics represent an alternative light weight panel construction which achieves the same advantageous effects as honeycomb. Large quantities of empty spaces in the foam allow for very light weight. If the foam is bonded between the faceplates, it is protected and loads are distributed into the foam. The Nickel foam generally includes empty spaces or bubbles that are not necessarily interconnected (closed cell foam). The surface, by virtue of being cut, is a rough and highly porous surface for a short distance into the slab. This surface is impregnated with Nickel-Hydroxide by a chemical or electrochemical process. Similarly, the anode is coated with a Metal-Hydride material. The separator material is a rigid open cell foam which is electrically-insulating but capable of absorbing electrolytes such as Potassium-Hydroxide and allowing ion transport between the two electrodes. A fourth foam material provides insulation between the adjacent electrodes. It is a rigid foam plastic and may be either open or closed cell. This is the cell boundary layer 160 between the adjacent cells 152. The electrolyte is limited to the separator 164 and the surfaces of the electrodes 162 and 166. Most of the empty spaces in the foamed material of which the electrodes 162 and 166 are composed remain void except for residual gases. The bulk of the foam material of which the electrodes 162 and 166 are composed serves as a very low impedance current collector. In this embodiment the elements of the battery are configured so as to create a light weight structural material. In this manner, the mass and volume of the battery may be distributed about the vehicle or device requiring electric power and may perform a useful function relative to the vehicle or device.

From the example of alternative electrode stack sequencing, it should be apparent to anyone practiced in the art that this invention can adopt almost any electrode stack sequence. The electrodes and separators still may be configured in an elongated manner and formed into a honeycomb core material in which they serve as structural elements as well as battery components to thereby allow distribution of the mass and volume of the battery throughout the vehicle or device which requires electric power and in which the elements of the battery perform another useful function for the vehicle or device in addition to energy storage.

It should be apparent to anyone practiced in the art that a wide variety of electrodes and separator configurations, beyond the specific embodiments of honeycomb and foam configurations may be devised in which elements of the battery (electrodes, separators, current collectors, or insulating boundaries) serve as light weight structural members to thereby allow distribution of the mass and volume of the battery throughout the vehicle or device requiring electrical power and in which the elements of the battery perform another useful function for the vehicle or device in addition to energy storage.

EXAMPLE

The vehicle of FIG. 8, such as a 1994 Chevrolet Suburban, may weigh in the range of 6,500 pounds, carry 300 pounds of gasoline, and have a range of 250 miles. It is conservatively estimated that an electric service vehicle of comparable size would require 35 kilowatts of power to cruise at 60 miles per hour. To travel at least 200 miles at this 60 mile per hour rate would thus require 117 kilowatt-hours. A twenty inch by twenty inch by two inch battery panel, such as the battery panel 48 described in conjunction with the first embodiment and shown in FIGS. 6 and 7, stores roughly 0.4 kilowatt-hours of energy and weighs 8 kg (17.6 lbs.). Such a panel might cost in the range of $78.00. It is estimated that with the 120 inch by 60 inch roof area of the Suburban, 18 such panels could be employed. Further, the underbody and chassis behind the fire wall could be replaced with roughly 112 such panels. The volume in the engine compartment provides room for 135 times the volume of one such panel, and the side walls and rear doors allow for another 100 such panels. In total, it is estimated that roughly 365 times the volume of one such panel could be employed in a Suburban, thus providing nearly 150 kilowatt-hours of energy storage.

The weight of such an energy shell to provide 116 kilowatt-hours would be 928 kilograms (2,046 pounds). Since the energy shell provides additional functionality other than energy storage, this is not considered excessive weight, especially when compared to present state of the art battery designs which would require over 1,500 pounds of battery mass in a concentrated lump form which could be dangerous in an accident. The present invention serves to protect the occupants in an accident, rather than becoming a potential hazard, because the weight is uniformly distributed throughout the vehicle and is self supporting and the structure with a multitude of voids (such as honeycomb or foam) absorbs mechanical energy on impact. In addition, the estimated cost of the battery for such a vehicle utilizing the present invention is in the range of $23,000, the same as for state of the art NiMH batteries, but provides the vehicle body and structure at practically no extra cost.

ADVANTAGES

The distributed battery system of the present invention is applicable not only to electrical vehicles, but to spacecraft, portable electronics, and cordless power tools. With each of these applications, the improved battery design can be used to provide structure for the device, possibly by forming the shell or container for the device. In satellite applications, the mechanical structure and the batteries comprise the top two sources of mass in unfueled, unmanned satellites. Combining the functionality of the two provides a great savings in mass. This battery system, unlike other battery systems, is integral with the structure of the device or vehicle, sharing the support and using the free surface area and volume to store large amounts of energy with minimum weight. With the improved battery design of the present invention it may be possible to save up to 50% of the battery mass which translates into more fuel and thus longer time in orbit, possibly as much as six additional months. A typical communications satellite earns $2–4 million per month in lease fees, so the additional time in orbit could produce more than $10 million in revenue.

In addition, the improved battery design of the present invention makes electric vehicles more feasible and allows for the replacement of motor vehicles powered by fossil fuels. Further, as compared to other rechargeable batteries for electric vehicles, the battery system of the present invention can be recharged in a shorter time period due to the increased capacity and surface area of the battery system. Also, the faster recharge time is possible because of the shorter thermal paths and the distributed thermal dissipation inherent in the design.

Lastly, the inherent light-weight, yet structurally strong and stiff properties of a honeycomb structure are a significant advantage of the battery system of the present invention, because it allows the battery itself to be used as a structural component of the vehicle or device.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to failing within the scope of the invention as defined by the claims which follow.

The invention claimed is:

1. A battery for supplying power to an electrical circuit having a first terminal and a second terminal, comprising:
   an elongated anode including a first reagent, the anode being connectable to the first terminal of the circuit;
   an elongated cathode positioned adjacent and in spaced-apart relation to the anode, the cathode including a second reagent and being connectable to the second terminal of the circuit;
   a separator positioned between the anode and the cathode which provides electrical insulation between the anode and the cathode yet permits an electrochemical reaction to occur involving the transfer of ions between the anode and cathode, the transfer of ions allowing electrical current to flow from the cathode through the circuit to the anode of the battery;
   wherein the anode, the separator, and the cathode form an elongated electrode stack; and
   wherein a plurality of elongated electrode stacks are connected together in a honeycomb structure.

2. A battery as defined in claim 1, wherein the separator is permeable and is wetted with an electrolyte solution which allows the electrochemical reaction involving the first and second reagents to occur, in which ions are transferred between the reagents to allow electrical current to flow from the cathode through the circuit to the anode of the battery.

3. A battery as defined in claim 1, wherein the anode includes a support layer and a reagent layer.

4. A battery as defined in claim 1, wherein the anode includes a current collector layer and a reagent layer.

5. A battery as defined in claim 1, wherein the anode includes a support layer, a current collector layer, and a reagent layer.

6. A battery as defined in claim 1, wherein the cathode includes a support layer and a reagent layer.

7. A battery as defined in claim 1, wherein the cathode includes a current collector layer and a reagent layer.

8. A battery as defined in claim 1, wherein the cathode includes a support layer, a current collector layer, and a reagent layer.

9. A battery as defined in claim 1, wherein the anode and cathode are bonded to the separator.

10. A battery as defined in claim 9, wherein the anode and cathode are bonded to the separator by spot welds.

11. A battery as defined in claim 2, wherein the first reagent includes a metal-hydride, the second reagent includes nickel-hydroxide, and the electrolyte solution includes potassium-hydroxide.

12. A battery as defined in claim 1, wherein the honeycomb structure is formed by applying adhesive at a series of regular, spaced-apart positions between each pair of adjacent electrode stacks.

13. A battery as defined in claim 12, wherein the positions of the adhesive between any pair of adjacent electrode stacks is offset from the positions of the adhesive between one of the pair of adjacent electrode stacks and the oppositely-adjacent electrode stack.

14. A battery as defined in claim 13, wherein the separator includes at least one region of solid material adjacent to and corresponding to each of the adhesive positions.

15. A battery as defined in claim 1, wherein a plurality of separate honeycomb structures are each combined as separate cells into a battery panel including:

an insert frame which receives each of the plurality of separate cells; and a pair of faceplates, an upper faceplate and a lower faceplate, which are attached to the insert frame from opposite sides to sandwich the cells therein.

16. A battery as defined in claim 15, wherein the faceplates are attached to the insert frame and to the separate cells by adhesive, the attachment to the insert frame being made by electrically-insulating adhesive and the attachment to the separate cells being made by electrically-conducting adhesive.

17. A battery as defined in claim 15, further including a plurality of edge closures peripherally outside of the insert frame and the separate cells and also sandwiched between the faceplates.

18. A battery as defined in claim 16, wherein the first reagent includes a metal-hydride, the second reagent includes nickel-hydroxide, and the electrolyte solution includes potassium-hydroxide;

wherein the separator is permeable and is wetted with the electrolyte solution which allows an electrochemical reaction involving the first and second reagents to occur, in which ions are transferred between the reagents to allow electrical current to flow from the cathode through the circuit to the anode of the battery;

wherein the anode and the cathode each include a support layer, a current collector layer, and a reagent layer;

wherein the anode and cathode are bonded to the separator by spot welds; and wherein the honeycomb structure is formed by applying adhesive at a series of regular, spaced-apart positions between each pair of adjacent electrode stacks and the positions of the adhesive between any pair of adjacent electrode stacks is offset from the positions of the adhesive between one of the pair of adjacent electrode stacks and the oppositely-adjacent electrode stack and the separator includes at least one region of solid material adjacent to and corresponding to each of the adhesive positions.

19. A battery as defined in claim 2, wherein the first reagent is a hydrogen catalyst, the second reagent includes nickel-hydroxide, and the electrolyte solution includes potassium-hydroxide.

20. A battery as defined in claim 19, wherein the hydrogen catalyst is platinum.

21. A battery as defined in claim 1, wherein the first reagent is a source of lithium ions and the second reagent is a material which can receive and store lithium ions.

22. A battery as defined in claim 21, wherein the source of lithium ions is lithium metal and the material which can receive and store lithium ions is manganese-dioxide.

23. A battery as defined in claim 1, wherein the electrochemical reaction is reversible so that energy may be stored in the battery by charging the battery and the energy may be extracted from the battery by discharging the battery.

24. A battery as defined in claim 5, wherein a nickel plasma is sputtered onto a thin film to form the current collector layer on the substrate layer and a metal-hydride is deposited on the nickel current collector layer to form the reagent layer.

25. A battery as defined in claim 8, wherein a nickel plasma is sputtered onto a thin film to form the current collector layer on the substrate layer and a layer of nickel-hydroxide is deposited thereon.

26. A battery as defined in claim 1, further including a second separator and second cathode positioned adjacent to the anode and on an opposite side of the anode from the first separator and first cathode.

27. A battery as defined in claim 2, wherein a separate half-reaction occurs between the anode and the electrolyte solution and a complementary and separate half-reaction occurs between the cathode and the electrolyte solution.

28. A method for assembling a battery, comprising the steps of:

providing an elongated anode including a first reagent;

providing an elongated cathode including a second reagent;

providing an elongated, porous separator;

bonding the anode and cathode to opposite sides of the separator to form an elongated electrode stack;

assembling a plurality of elongated electrode stacks into a honeycomb structure; and wetting the separator with an electrolyte.

29. A method as defined in claim 28, wherein the separator includes a plurality of continuous solid portions; and wherein the bonding step includes spot welding the anode and cathode to the separator by heating each of the continuous, solid portions to a temperature approaching the melting point of the solid portion of the separator while applying pressure to force the anode and cathode toward the solid portion.

30. A method as defined in claim 28, wherein the honeycomb structure defines a battery cell, the method further including the steps of:

isolating a plurality of the battery cells from each other;

encasing the plurality of isolated battery cells within a shell to form a battery panel; and providing electrical feed-throughs from the battery cells to the exterior of the shell.

* * * * *